Figure 2:
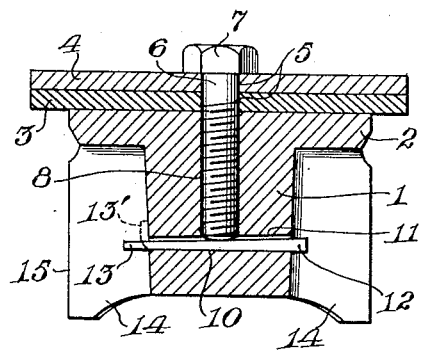

I. G. ENGLE.
VALVE.
APPLICATION FILED NOV. 18, 1918.

1,329,231.

Patented Jan. 27, 1920.

WITNESS:
Merrill R. Cranmer

INVENTOR.
Isaiah G. Engle,
BY J. Stuart Freeman,
ATTORNEY.

UNITED STATES PATENT OFFICE.

ISAIAH G. ENGLE, OF PHILADELPHIA, PENNSYLVANIA.

VALVE.

1,329,231.  Specification of Letters Patent.  Patented Jan. 27, 1920.

Application filed November 18, 1918. Serial No. 262,933.

*To all whom it may concern:*

Be it known that I, ISAIAH G. ENGLE, a citizen of the United States, residing at Philadelphia, in the county of Philadelphia and State of Pennsylvania, have invented certain new and useful Improvements in Valves, of which the following is a specification.

The object of this invention is to provide an improved valve construction for use in various types of valve casings and in connection with various forms of valve operation, and equally well adapted to control the flow of any kind of fluid.

As stated, the invention comprising an improvement in the construction of a valve *per se*, it is deemed unnecessary to illustrate or describe any of the infinite number of valve casing constructions with which it may be employed.

The particular form of valve illustrated in the drawings is for use as a so-called one-way valve, and therefore does not have connected to itself any operating stem-shaft or the like.

In the formation of valves of this general type it is obviously necessary to secure the gasket employed in place and this is often done by means of a bolt which extends into and coöperates in threaded engagement with the body of the valve, but greater difficulty has been experienced in retaining said bolt in position as long as such is desired, and yet permit it to be removed as by means of a wrench also when and as desired without mutilating the bolt itself or any element associated therewith.

The object of this invention therefore is, more specifically, to provide a simple yet highly efficient means for yieldably locking the said bolt in its innermost position, for the purpose of maintaining a valve gasket firmly fixed in its normal operative relation with respect to the other parts of the valve.

Figure 1:
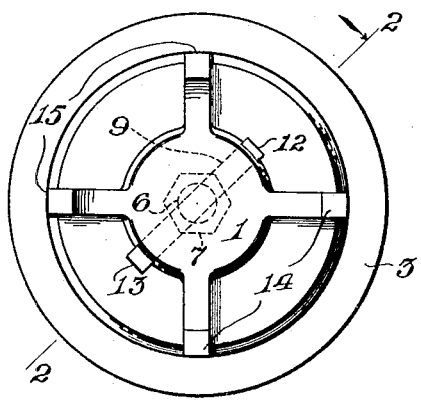

With these and other objects, the invention consists in certain novel details of construction, hereinafter fully described and clearly illustrated by means of the accompanying drawings, in which Figure 1 is a bottom plan view of the improved valve construction; and Fig. 2 is a longitudinal diametrical view taken on the line 2—2 of Fig. 1.

Referring to the drawings, the valve comprises a body portion 1, provided with a radially extending peripheral flange 2, against which a relatively soft gasket 3 of any suitable material adapted to eliminate all tendency to grind the valve seat, is securely and uniformly maintained by means of a metal disk 4, both said gasket and said disk being axially provided with centrally disposed apertures 5, through which a bolt 6 extends.

The head 7 of said bolt preferably coöperates with the disk 4, and thus indirectly with the gasket 3 to maintain the latter fixedly against the adjacent surface of the flanged portion 2 of the valve 1, while the threaded shank portion of said bolt engages the longitudinally extending axially positioned threaded bore 8 within said member 1.

Extending transversely of the body portion 1 of said valve is a channel 9, having a lower side 10 lying in a plane perpendicular to the longitudinal axis of said valve, while the upper or opposite side 11 of said channel is angularly related to said first side, or, in other words, converges and diverges in opposite directions with respect thereto.

The channel 9 is so positioned in said valve that the axial bore 8 terminates therein, said bore being of sufficient length to substantially only provide for the length of the particular bolt which it is desired best to use, corresponding with the strains which such a valve is designed to encounter.

When in the operation of this device, a valve, a gasket, a disk and securing-bolt are assembled as shown in Fig. 2, and when said bolt has been screwed by any suitable instrument as far as it will enter the bore 8, a tapering wedge-shaped member 12 is inserted into the larger end of the channel 9 and driven by any suitable means as far therethrough as is possible thus frictionally engaging the end of the bolt 6 and forcing the latter to so firmly bind against the threaded sides of said bore as to lock said bolt in the position shown, after which the smaller end 13 of the wedge-shaped member 12 may be bent over as indicated by dotted lines 13′, to prevent the same from becoming loose in said channel and releasing its locking effect upon said bolt.

When and in the event of the gasket 3 wearing to such an extent as to necessitate the substitution of a new gasket therefor, the smaller end 13 of the wedge member is straightened and driven longitudinally from the channel 9 in the reverse direction to that by which it was inserted, thus removing the locking restraint upon the loosening by suitable means of the bolt 6 in order to release the disk 4 and gasket 3.

In addition to the foregoing construction, the valve illustrated also embodies any desired number of radially extending wings 14 provided with parallel radially outer surfaces 15, which latter serve to guide the valve as a whole longitudinally in a rectilinear direction within the particular casing with which it is desired to use said valve.

Having thus described my invention, what I claim and desire to protect by Letters Patent of the United States is:—

1. A valve comprising a body portion, a threaded aperture extending thereinto, and a transversely extending aperture at one end and opening into said first aperture, said last-named aperture being adapted to receive means for locking in a given position a threaded member in said first aperture, and said means operating to permit the withdrawal of the threaded member from the threaded aperture without removing said means from said transverse aperture.

2. A valve comprising the combination of a body member with a gasket, means to removably secure said gasket to said member and in threaded engagement with a threaded aperture within said member and a transversely extending aperture in said member at the inner end of and opening upon one side into said first aperture, and adapted to receive means for locking said first means in said first aperture, said locking means operating to permit the removal of said securing means without removing said locking means from said transverse aperture.

3. A valve comprising the combination of a body member with a gasket, a threaded aperture in said member, means adapted to enter and coöperate with the threads of said aperture and to removably secure said gasket to said member, a second transversely positioned aperture at one end of and opening into said first aperture, and a wedge-shaped member adapted to be forced into said second aperture to engage and lock in a predetermined position said means in said first aperture, said wedge-shaped member when out of locking engagement with said first means operating to permit the removal of said means without removing said locking member from said transverse aperture.

4. A valve comprising the combination of a body member with a gasket, a threaded aperture in said member, means adapted to enter and coöperate with the threads of said aperture and to removably secure said gasket to said member, a second transversely positioned aperture at one end and opening into said first aperture and a wedge-shaped member adapted to be forced into said second aperture to engage frictionally the end surface of said securing means and tending to thrust said securing means longitudinally outwardly of its aperture to bind its threads against those of its aperture, to lock in a predetermined position said securing means.

5. In a bolt lock, the combination of a member provided with a threaded aperture of limited extent, a second aperture extending transversely through said member and in which said first aperture terminates, a threaded member entering said first aperture and projecting into the second aperture, and a wedge-shaped member extending through the second aperture, tightly engaging the threaded member to lock its threads against those of the said first aperture, and having its first-inserted end portion bent angularly, to prevent its ready withdrawal from said second aperture and release of said threaded member.

In testimony whereof I have affixed my signature in the presence of two witnesses.

ISAIAH G. ENGLE.

Witnesses:
   Merrill T. Cranmer,
   Douglas Leake.